United States Patent [19]

Droulon

[11] Patent Number: 5,496,225
[45] Date of Patent: Mar. 5, 1996

[54] VEHICLE SEAT ARTICULATIONS

[75] Inventor: Georges Droulon, Saint Georges Des Groseillers, France

[73] Assignee: Bertrand Faure Automobile "BFA", Massy, France

[21] Appl. No.: 278,887

[22] Filed: Jul. 22, 1994

[30]  Foreign Application Priority Data

Jul. 26, 1993 [FR] France .................................. 93 09188

[51] Int. Cl.$^6$ ...................................... F16H 1/32
[52] U.S. Cl. ........................................ 475/177; 475/180
[58] Field of Search ...................... 475/177, 180

[56]  References Cited

U.S. PATENT DOCUMENTS 4,895,038  1/1990  Pipon et al. ............................ 475/180

FOREIGN PATENT DOCUMENTS 0063510  10/1982  European Pat. Off. .
0098952  1/1984  European Pat. Off. .
0505229  9/1992  European Pat. Off. .

Primary Examiner—Dirk Wright
Attorney, Agent, or Firm—Kirschstein, et al.

[57]  ABSTRACT

The vehicle seat articulation includes a fixed flange fixed to a first framework of the seat, a mobile flange rigidly connected to a second framework of the seat, a cup member enabling the mobile flange to execute an orbital movement causing an angular movement of the articulation, and a dish member maintaining the mobile flange against the fixed flange. The edge of the dish member is formed with an outer toothing that cooperates with toothings of semi-cut portions of the mobile flange. The toothings of the edge of the dish member and the toothings of the semi-cut portions have each a height equal to twice that of an off-center distance "e" provided between two shoulders of the cup member.

1 Claim, 1 Drawing Sheet

5,496,225

VEHICLE SEAT ARTICULATIONS

FIELD OF THE INVENTION

The invention relates to vehicule seat articulations.

BACKGROUND AND OBJECT OF THE INVENTION

Automobile seats as well as seats for railway vehicles, aircrafts, etc., now comprise devices for adjusting the longitudinal position of the seats. Most of these seats comprise also other devices adapted for adjusting the inclination of the backing portion and sometimes also devices for adjusting the inclination of the head-rest placed atop the backing portion of the seat.

But these mechanisms, which must have a considerable resistance to the various torsion forces to which they are subjected, have to remain perfectly immobilized upon a side or frontal impact on the vehicle in consideration so as to maintain the passenger of the seat under good conditions.

Orbital movement articulation mechanisms without satellite have now been developed, which operate perfectly and are highly resistant, but, in order to improve their resistance, it is necessary to provide for an additional blockage; this is the object of the articulation concerned by the present invention. The inventive articulation is thus of the orbital movement without satellite type and ensures an extra blockage by using a toothing formed on the edge of a dish member connecting the fixed and mobile flanges of the articulation, this toothing cooperating with toothed semi-cut portions of the mobile flange.

SUMMARY OF THE INVENTION

According to the invention, the vehicle seat articulation comprising a fixed flange fixed to a first framework of the seat, a mobile flange rigidly connected to a second framework of the seat, a cup member enabling the mobile flange to execute an orbital movement causing an angular movement of the articulation, and a dish member maintaining the mobile flange against the fixed flange, and is characterized in that the cup member is provided with two shoulders, the mobile flange has semi-cut portions formed with toothings, the dish member has an edge formed with an outer toothing that cooperates with the toothings of the semi-cut portions of the mobile flange, the toothings of the edge of the dish member and the toothings of the semi-cut portions each having a height equal to double that of an offcenter "e" provided between the two shoulders of the cup member.

Various other features of the invention will become more apparent from the following detailed description.

BRIEF DESCRIPTION OF THE DRAWING

An embodiment of the invention is shown by way of a non limiting example in the accompanying drawing, wherein.

DETAILED DESCRIPTION OF A PREFERED EMBODIMENT

Figure 2:
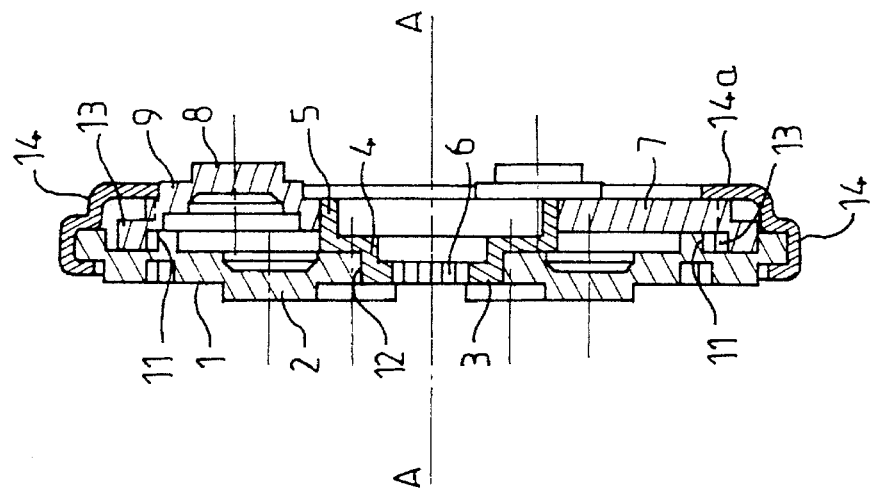
FIG. 2 is a diametrical cross sectional view taken along line II—II of FIG. 1.

Refering now to the drawing, FIG. 2 shows an articulation provided with a fixed flange 1 that includes, placed at 120° apart from one another, bosses 2 for a fixation of the fixed flange 1 on the framework of the sitting portion of a seat (not shown).

Figure 1:
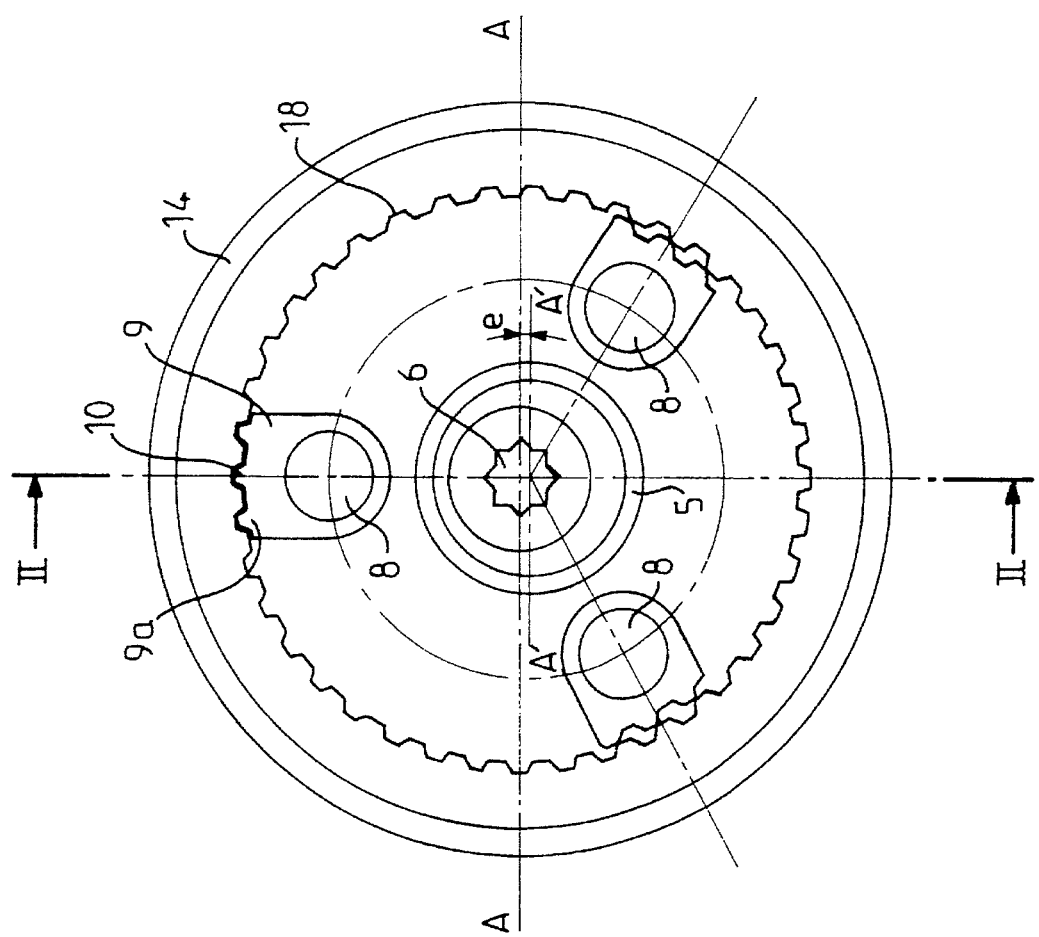
FIG. 1 is a front view of a mobile flange of an articulation held against a fixed flange of the articulation by a dish member, formed with an outer toothing, for cooperating with toothed semi-cut portions rigidly connected to fixation protrusions of the mobile flange onto the framework of the backing portion of the seat.

The fixed flange 1 is formed with a central aperture 12 receiving a first outer shoulder 4 of a cup member 3 which also has a second shoulder 5 which is off-centered by a distance "e" with respect to the inner shoulder 4 (FIG. 1). The shoulder 5 carries a mobile flange 7.

The cup member 3 is formed with a central star-shaped channel in order to receive a fluted shaft (not shown) provided for the control in rotation of the articulation.

As known, the fixed flange 1 is formed inside with a circular toothing 11 on which is mounted the inner toothing 13 of the mobile flange 7.

The mobile flange 7 is held on the fixed flange 1 via a dish member 14 crimped on the outer periphery of the fixed flange 1 and comprising a circular turned part 14a maintaining the mobile flange 7 against the fixed flange 1 while enabling a rotation of the mobile flange 7 with respect to the fixed flange 1 by a rolling motion of the inner toothing 13 on the circular toothing 11.

The mobile flange 7 is formed with semi-cut portions 9 placed at 120° from one another and each comprising an upper region 9a provided with a toothing 10.

The mobile flange 7 is also formed with other semi-cut portions 8 enabling an easy fixation of the mobile flange 7 on the framework of the backing portion of the seat.

Finally, the outer periphery of the circular turned part 14a of the dish member 14 is formed with a toothing 18 adapted for cooperating with the toothings 10 of the semi-cut portions 9.

When it is desired to adjust the inclination of the backing portion of the seat in consideration with respect to the sitting portion, the cup member 3 is rotated via a fluted shaft as mentioned hereabove, and the mobile flange 7 is then driven in rotation due to the off-center, thereby causing an orbital movement of the mobile flange 7, with the toothings 13 of the mobile flange 7 rolling on the toothings 11 of the fixed flange 1. This orbital movement causes the disengagement of one of the toothings 10 of the semi-cut portions 9 from the fixed toothing 18 of the dish member 14, but brings progressively another semi-cut portion 9 in contact, via its toothing 10, with the fixed toothing 18, and as the orbital movement proceeds, the passage on the third semi-cut portion 9 and so forth, until the moment when the backing portion of the seat is in the desired position.

At that moment, one of the toothings 10 is engaged into the toothing 18, thereby ensuring a perfect blockage of the mobile flange 7 with respect of the fixed flange 1 since the dish member 14 is rigidly connected to the fixed flange 1.

It should be noted that height of the toothing 18 as well as that of the toothings 10 of the semi-cut portions 9 is equal to twice that of the off-center "e" (see FIG. 1).

This off-center is also seen in FIG. 1 due to the offset between the shoulders 4 and 5 of the cup member 3, the shoulder 4 being centered on the main axis A—A and the shoulder 5 being centered on the axis A'—A'.

FIGS. 1 and 2 show a so-called "round" articulation since the two flanges 1 and 7 are circular, but of course this articulation could also be a so-called "half-round" articulation, that is with a circular mobile flange 7 and a semi-circular fixed flange 1 provided with a wing directly fixed onto an element of the seat.

What I claimed is:

1. A vehicle seat articulation, comprising: a fixed flange; a mobile flange; a cup member for enabling said mobile flange to execute an orbital movement causing an angular movement of said articulation; and a dish member for maintaining said mobile flange against said fixed flange; said cup member having two shoulders, a first one of said shoulders being off-centered by a predetermined distance with respect to a second one of said shoulders; said mobile flange having a plurality of semi-cut portions each formed with teeth; said dish member having an edge formed with outer teeth that cooperate with said teeth of said semi-cut portions; said teeth of said edge of said dish member and said teeth of said semi-cut portions, each having a height equal to twice said predetermined distance.

* * * * *